United States Patent [19]
Morearty

[11] Patent Number: 5,900,024
[45] Date of Patent: May 4, 1999

[54] METHOD FOR PROCESSING TYPE-AHEAD INPUT AND OPERATION-ABORT INPUT

[75] Inventor: Brian Morearty, Palo Alto, Calif.

[73] Assignee: Oracle Corporation, Redwood Shores, Calif.

[21] Appl. No.: 08/745,025

[22] Filed: Nov. 7, 1996

[51] Int. Cl.$^6$ .................................................... G06F 9/00
[52] U.S. Cl. ................................ 712/225; 712/201
[58] Field of Search ................................ 395/561, 736, 395/566, 567, 733

[56] References Cited

U.S. PATENT DOCUMENTS

| | | | |
|---|---|---|---|
| 4,764,864 | 8/1988 | Takane ................................ | 395/736 |
| 5,301,331 | 4/1994 | Ueno et al. ......................... | 395/733 |
| 5,438,677 | 8/1995 | Adams et al. ...................... | 395/736 |
| 5,623,603 | 4/1997 | Jiang et al. ........................ | 395/200.37 |
| 5,664,200 | 9/1997 | Barlow et al. ..................... | 395/741 |
| 5,689,713 | 11/1997 | Normoyle et al. ................. | 395/736 |

OTHER PUBLICATIONS

Investigating the hybrid windowing and messaging architecture of Chicago by Pietrek, Microsoft Systems Journal, Sep. 1994 v9 n9 p15.

Building sticky windows by Prosise, PC Magazine Nov. 7, 1995 v14 n19 p355 (6).

Meandering through the maze of MFC message and command routing by DiLascia, Microsoft Systems Journal Jul. 1995 v10 n7 p17 (18).

"Peter Norton's Windows 3.1 Power Programming Techniques 2nd Edition", Peter Norton & Paul Yao, pp. 68–74, 429–442, 725–726.

*Primary Examiner*—Parshotam S. Lall
*Assistant Examiner*—Zarni Maung
*Attorney, Agent, or Firm*—Blakely, Sokoloff, Taylor & Zafman LLP

[57] ABSTRACT

A method for processing user-input that may include a command to abort a previously requested operation and typed-ahead data entered in anticipation of completion of the previously requested operation is disclosed. The user-input is represented by a value queued in a first queue by an operating system. According to the present invention, the value is removed from the first queue and examined to determine if it represents a command to abort the previously requested operation. If the value represents a command to abort the previously requested operation, the previously requested operation is aborted. If the value does not represent a command to abort the previously requested operation, the value is queued in a second queue, and, after completion of the previously requested operation, the value is removed from the second queue and associated with a display window to which user-input is focused at that time.

22 Claims, 8 Drawing Sheets

ORDER ENTRY

| Field | Ref |
|---|---|
| COMPANY NAME: | AEROF — 110 |
| ID#: | 115 |
| CONTACT: | 120 |
| TELEPHONE: | 125 |
| ADDRESS: | 130 |
| ITEM: | 135 |
| QUANTITY: | 140 |

METHOD FOR PROCESSING TYPE-AHEAD INPUT AND OPERATION-ABORT INPUT

BACKGROUND OF THE INVENTION

(1) Field of the Invention

The present invention relates to processing user-input. More specifically, the present invention relates to a method for processing type-ahead input and operation-abort input in an application program which must perform time-intensive operations.

(2) Art Background

Most computer-users are familiar with type-ahead capability. Occasionally, the computer gets busy performing one operation or another and does not respond to user-input such as mouse clicks or keyboard entry. Then, after the computer has finished doing whatever caused the non-response, the computer rapidly processes the input to "catch up" with the user. Two familiar examples of type-ahead include typing in a word-processing application while the computer is busy saving, repaginating or printing a document, and entering data in a data-entry program while the computer is busy sending or retrieving data from a database server. The common characteristic in both cases is that type-ahead capability permits the user to submit input without having to wait for a previously initiated operation to complete. Since a fundamental goal of any user-interface design is to minimize the amount of time a user must spend waiting on the computer, type-ahead capability is clearly a desirable feature.

Operation-abort capability is also familiar to most computer users. Occasionally, after requesting the computer to perform an operation, such as printing a word-processing document or searching a database, a computer-user will want to abort the operation before it is completed. This is typically accomplished by pressing a predetermined set of keys, such as "control-C" or "control-Break" (accomplished by holding down the "control" key and then pressing the "C" or "Break" key, respectively). Without operation-abort capability the user would be forced to await completion of the previously requested operation despite the fact that the result of the operation is no longer desired. Since, as mentioned above, a fundamental goal of a user-interface design is to minimize the amount of time a user must spend waiting on the computer, and since it is obviously inefficient to force a user to wait for completion of an unnecessary operation, operation-abort capability is a desirable feature in any application program which must perform time-intensive operations.

Despite the dear advantages of providing a computer-user with both operation-abort and type-ahead capabilities, developers of application programs written for Microsoft Windows™ 3.x operating systems have had to sacrifice type-ahead capability in order to provide operation-abort capability. Due to difficulties inherent in the design of the Windows 3.x operating system, when operation-abort capability is provided in prior-art Windows 3.x application programs, type-ahead capability is disabled.

The Microsoft Windows 95 and Windows NT operating systems (hereinafter referred to collectively as 32-Bit Windows) provide a possible solution to the problem of implementing both the type-ahead and operation-abort features. Unfortunately, the solution works only in application programs designed for and run on the 32-Bit Windows platform and is not backward-compatible with the older Windows 3.x platform. This is significant because there is still an enormous base of Windows 3.x installations and it is commercially desirable to target application programs for both the Windows 3.x and the 32-Bit Windows operating systems. For developers of application programs intended to run on both Windows 3.x and 32-Bit Windows, the inability to provide both type-ahead and operation-abort capability is still a problem. This problem is overcome by the present invention.

BRIEF SUMMARY OF THE INVENTION

A method for processing user-input that may include either a request to abort a previously requested operation or typed-ahead data entered in anticipation of completion of the previously requested operation is disclosed. After the user-input is queued in an operating-system maintained queue, the user-input is processed by calling an operating-system procedure to remove a value representing the user-input from the operating-system-maintained queue. The value is then examined to determine if it represents a command to abort the previously requested operation. If so, the previously requested operation is aborted, for example, by terminating execution of a procedure which had been polling for completion of the previously requested operation. If the value does not represent a command to abort the previously requested operation, it is queued in a second queue. Later, after completion of the previously requested operation, the value is removed from the second queue and directed to a window to which user-input is presently focused.

In a Windows 3.x operating system, one operating system to which the present invention is applicable, input events removed from the operating-system-maintained event queue are associated with a focus window existing at the time the event is dequeued. Since a previously requested and still pending operation may change this focus window, the method of the present invention overrides the focus window indicated by the operating-system with the focus window existing at the time the input event is dequeued from the second queue.

BRIEF DESCRIPTION OF THE DRAWING

FIG. 1 depicts a display window for an order entry application program.

DETAILED DESCRIPTION OF THE INVENTION

Figure 2:
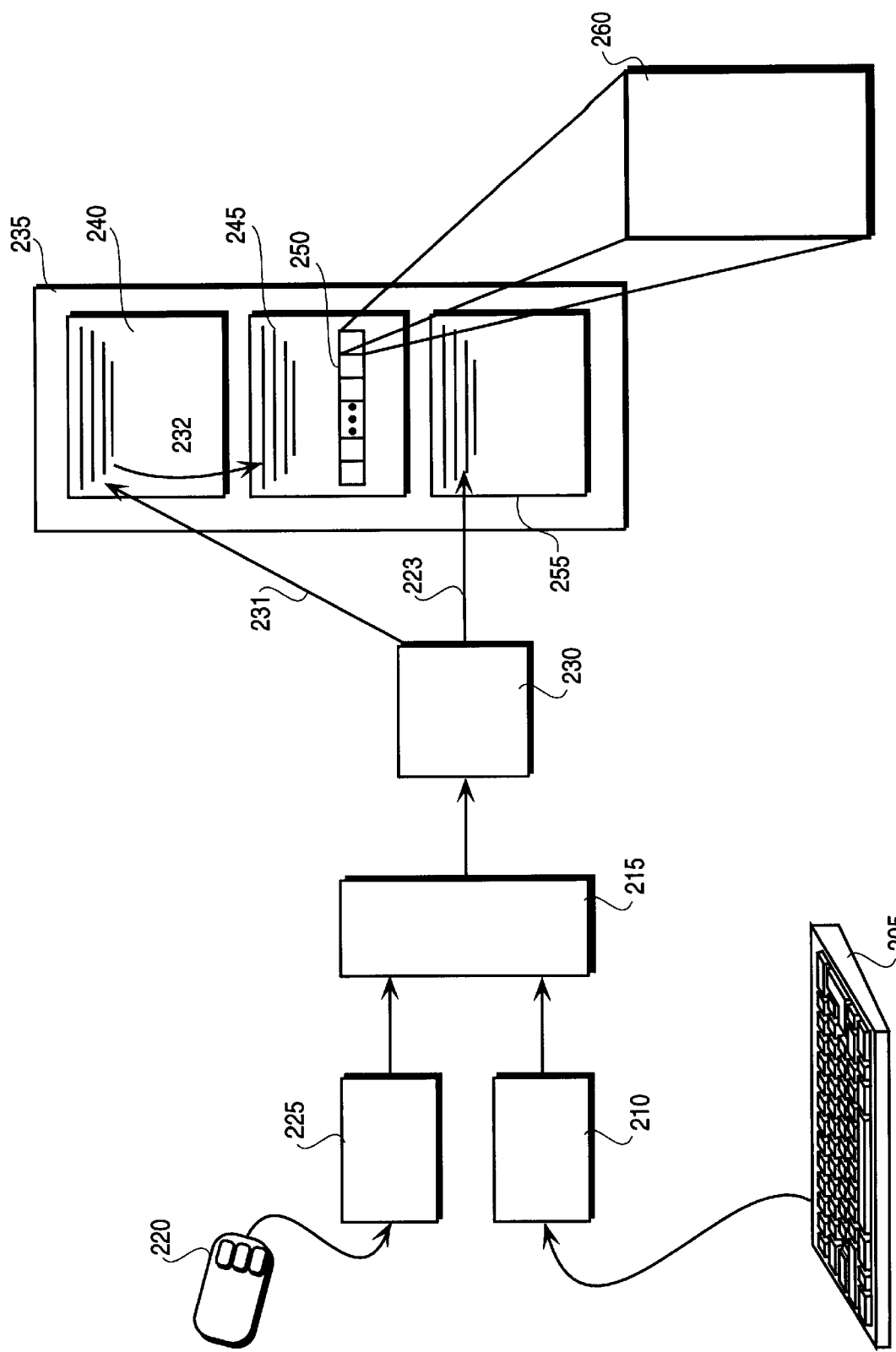
FIG. 2 illustrates the manner in which user-input becomes a message in an operating-system maintained event queue.

A method and apparatus for processing both abort commands and type-ahead input are disclosed. Although numerous specific details are set forth in order to provide a thorough understanding of the present invention, it will be apparent to one skilled in the art that the present invention may be practiced without such specific details. For example, much of the following description involves supporting type-ahead and operation-abort capability while awaiting completion of a data retrieval operation. It will be readily appreciated that the present invention can be used to support type-ahead and operation-abort capability pending completion of any time-intensive operation. Also, since the present invention is immediately applicable to application programs written for the Microsoft Windows™ 3.x operating system ("3.x" refers to the 16-bit Windows operating system versions 3.0 and 3.1), much of the discussion which follows centers around Windows 3.x and the message handling nature of Windows 3.x application programs. Nevertheless, it will be appreciated that the method of the present invention may be employed in any machine in which input events are queued in an event queue for processing by an event loop.

Virtually all graphical user-interface (GUI) driven application programs include an event loop to poll for user-input. The event loop itself is simple. On each cycle of the loop, an operating-system-maintained storage of user-input events, such as keyboard entry and mouse button clicks, is sampled to obtain a value or set of values representing a user-input If the value indicates a command to quit the event loop, the event loop, and therefore the application program, terminates. Otherwise, the event loop calls one of a number of input-handling procedures to handle the input The particular procedure called to handle the input will usually depend on the character of the input (i.e., mouse button click, keyboard entry, etc.) and the window in the GUI to which the input is directed. After the input has been handled by an input handling procedure, the event loop cycle is completed and the next user-input event is retrieved and processed in a successive cycle.

Like any computer program which polls for input, an application program which relies on an event loop becomes unresponsive if the event loop does not cycle frequently enough to keep pace with user-input. Given the power of modem processors, this is usually not a problem. However, in an application program which must occasionally perform a time-intensive operation, such as performing a bulk processing operation or waiting for a response from a hardware device or from another process, the program user may notice that keystrokes and mouse clicks are not responsively handled. From the user's perspective, the computer appears to freeze for a period of time.

Order Entry Application Program

FIG. 1 shows an order entry screen of an application program running under the Windows 3.x operating system. As stated above, the present invention finds broad applicability in application programs designed to be executed under Windows 3.x. However, the present invention may also be employed in application programs written for other operating systems.

Assume that the purpose of the order entry screen 100 is to allow an order clerk of a commercial office products vendor to enter telephoned product orders into a database. The database is typically maintained on a separate "database server" computer so that it can receive orders from any of a number of order clerks on duty. Assume further that, after the first few characters of the caller's company name have been entered in the company name field 110 and the tab key has been pressed, the application program is designed to automatically fill in the remainder of the company's name, ID# (field 115), Contact (field 120), Telephone number (field 125) and Address (130) with data from the database. Then, the application program shifts the keyboard focus to the Item field 135.

As an aside, in a GUI application the keyboard focus, or "focus window", is the window to which keyboard input is directed. The window to which keyboard input is directed is either the active window or a child window of the active window. It will be appreciated that each of the data entry fields 110, 115, 120, 125, 130, 135 and 140 are windows that may at one time or another be the keyboard focus. The same can be said for dialog box buttons, scrollbars, menubars and just about any other portion of a GUI which is designed to respond to user-input.

Assuming that, after stating the company name, the caller proceeds to specify the item and quantity sought and to inquire into the price per item. Of course, as the caller provides this information the order clerk may still be waiting for the database server to supply the requested company information. From the standpoint of the application program, prior to a response from the database server, the Company Name window 110 is still the keyboard focus. Moreover, instead of executing the event loop, the computer is executing a procedure that is polling for a response from the database server. Anticipating that the requested information will be displayed and the keyboard focus shifted to the Item window 135, the order clerk may proceed to type the item and quantity information specified by the caller. Of course, until the procedure awaiting a response from the database server is exited and the event loop begins to cycle again, the item and quantity information will not be displayed.

Fortunately, almost all operating systems, including Windows 3.x, buffer user-input events in an event queue. "Type-ahead" input, or, more generally, user-input entered in anticipation of completion of a previously requested operation, is queued in the event queue until the previously requested operation is completed and the event loop once again begins to process input events. In the context of the FIG. 1 order entry screen 100, this means that the item and quantity information entered in anticipation of completion of the data retrieval operation will ultimately be processed by the event loop of the application program. Assuming that the company information is successfully retrieved and the keyboard focus shifted to the Item window 135 prior to processing of the queued item and quantity data, by typing ahead, the order clerk will have successfully completed the order entry without having to wait for the data retrieval operation to be completed.

Of course, the fact that the order clerk can anticipate completion of the data retrieval operation by typing ahead, does not change the fact that user-input is not processed while program execution loops waiting for a response from the database server. To appreciate the significance of this fact, consider a situation in which, after pressing the tab key to request retrieval of company information, the clerk realizes that an incorrect company name has been entered. To avoid wasting time awaiting retrieval of unwanted information, the clerk may try to abort the data retrieval operation. Unfortunately, in the event loop discussed above, the clerk will be unable to do so since input events will not be processed until the data retrieval operation is completed.

In order to timely detect an abort command, the portion of the application program polling for response from the database server must examine input events while in the polling loop. Unfortunately, the Windows 3.x operating system does not allow application programs to examine input events, other than the first queued event, without removing input events from the queue. Since, once an input event is dequeued, Windows 3.x provides no mechanism for restoring the input event to its previous position in the queue, the application developer is faced with handling the input event in the procedure polling for response from the database server. Moreover, since Windows 3.x associates input events with the keyboard focus existing at the time of the input event is removed from the event queue, simply calling the input handling procedure indicated by the input event may result in the input being directed to the wrong window (recall that in FIG. 1, for example, the keyboard focus is likely to be changed upon completion of the data retrieval operation). Since the input event cannot be returned to its rightful position the operating system event queue and calling the indicated input handling procedure may result in error, the application developer is faced with the unhappy prospect of discarding the input altogether. Once the input is discarded, of course, type-ahead capability is lost. Consequently, application programs written for Windows 3.x that provide operation-abort capability have done so by sacrificing type-ahead capability.

As stated previously, the 32-Bit Windows operating system (Microsoft Windows 95 and Windows NT) provides a possible solution to the problem of implementing both the type-ahead and operation-abort features. From the perspective of an operating system developer, the problem stems from the inability to detect abort commands in the event queue without removing other non-abort command input events. To resolve this problem, in 32-Bit Windows the application developer is permitted to specify keystrokes which signify abort commands (or other input which requires immediate attention) and the operating system, upon detecting such input events, automatically moves the "need attention now" input to the head of the event queue. Since the input events at the head of the event queue may be examined by Windows application programs without being dequeued, the polling loop of the time-intensive operation need only monitor the head of the event queue to determine if an abort command has been input. If an abort command is detected, the application program may respond accordingly. Otherwise, the non-abort input events remain queued in the event queue for later processing by the application program's event loop.

Of course, since Windows 3.x does not provide the "move-to-the-head-of-the-queue" feature of 32-Bit Windows, application programs written to take advantage of the 32-Bit Windows feature may not detect operation-abort commands when executed on Windows 3.x. More specifically, when executed on Windows 3.x, application programs written to take advantage of the move-to-the-head-of-the-queue feature will not detect an abort command that is preceded by typed-ahead input. Consequently, the 32-Bit Windows solution does not meet the needs of application programs intended to be executed on both the Windows 3.x and 32-Bit Windows operating systems. For those programs, it is necessary to detect abort commands without altering the sequence of user-input events in the operating-system maintained queue. To appreciate this, it is helpful to examine the manner in which user-input is queued and dequeued (removed from a queue) in an operating-system-maintained queue.

Queuing User-Input in a Hardware Event Queue

FIG. 2 illustrates the manner in which input from a keyboard 205, mouse 220 or other user-input device is queued in a hardware event queue in a Windows 3.x environment. When a key on keyboard 205 is pressed, a signal identifying the depressed key, referred to as a "scan code", is communicated to a keyboard control circuit 210. Keyboard control circuit 210 then asserts an interrupt request to programmable interrupt controller 215 which, in turn, asserts an interrupt signal to processor 230. In a similar manner, user-input from mouse 220, such as mouse button clicks, are communicated to cursor control circuit 225. Cursor control circuit 225 then asserts an interrupt request to programmable interrupt controller 215 which, in turn asserts an interrupt signal to processor 230.

Once interrupted, processor 230 communicates with programmable interrupt controller 215 to obtain a value, known as an interrupt vector, indicating an address in memory 235 at which program code defining an interrupt handling procedure 240 is located. Then, as indicated by arrow 231, processor 230 executes the interrupt handling procedure 240. A different interrupt handling procedure is usually executed for keyboard and mouse input, but the principles involved are the same for each. In the case of keyboard input, the interrupt handling procedure 240 maps the scan code of the depressed key to one of a set of virtual key codes. Virtual key codes are simply numeric values associated with symbolic constants which are made available to application program developers.

After mapping the scan code to the virtual key code, the interrupt handling procedure 240 calls program code constituting a portion of the Windows 3.x operating system 245 (the call is indicated by arrow 232). When executed, the invoked Windows 3.x program code queues a message indicating the keyboard input in a hardware event queue 250. Mouse input is queued in a similar manner. The hardware event queue 250 is a first-in-first-out (FIFO) data structure made up of a linked list of messages. Messages indicating input events are queued at the tail of the queue and removed from the head of the queue. One significant characteristic of the hardware event queue maintained by Windows 3.x is that application programs can only examine the message at the head of the queue. If it is necessary to examine a subsequently queued message, for example to determine if it indicates entry of an abort command, each of the earlier queued messages must first be removed from the hardware event queue.

Structure of a Dequeued Windows 3.x Message

In Windows 3.x, a message 260 removed from event queue 250 has a structure given by the following C programming language type definition:

```
typedef struct tagMSG
{
    HWND      hwnd;
    UINT      message;
    WPARAM    wParam;
    LPARAM    lParam;
    DWORD     time;
    POINT     pt;
} MSG;
```

The hwnd member of a type MSG variable is used to store a value known as a window handle. The window handle allows the input event to be associated with (or directed to) a given display window. Specifically, the window handle is assigned the value of the handle to the window having keyboard focus at the time the input event is removed from the hardware event queue. From the standpoint of an event loop this is logical. After all, when the message is removed from the hardware event queue it makes sense for the event loop to transmit it to the message handler for the window to which user-input is currently focused. Also, since the message indicates the window to which it is directed, the event loop does not have to figure out which message handling procedure to invoke. As will be discussed further below however, simply assigning the handle of the keyboard focus to the message at the time the message is removed from the hardware event queue presents complications when attempting to provide an operation-abort capability.

Continuing the description of the MSG data type, the "message" member is assigned a code indicating the type of the input event. For example, when a key is pressed a code indicating the "keydown" event is assigned to the message parameter. The parameters wParam and lParam contain further information describing the character of the input event. In the case of a keypress, for example, wParam contains the virtual key code to which the key scancode was mapped by the interrupt handling procedure 240. The time and pt parameters indicate the time and location of the mouse pointer when the input event was queued in the hardware event queue.

After an input event has been queued in the hardware event queue 250 in the form of a message having the structure described above, execution of the operating system program code invoked by the interrupt handling procedure 240 is exited and the interrupt handler 240 is also exited. The pre-interrupt state of the processor 230 is restored, and execution of the program code 255 resumes from the point of interruption as indicated by arrow 233. Assuming that program code 255 includes an application program including an event loop, execution of the application program will eventually invoke a portion of the code defining operating system 245 to retrieve the message at the head of the hardware event queue 250.

Event Loop for Processing User-Input

Figure 3:
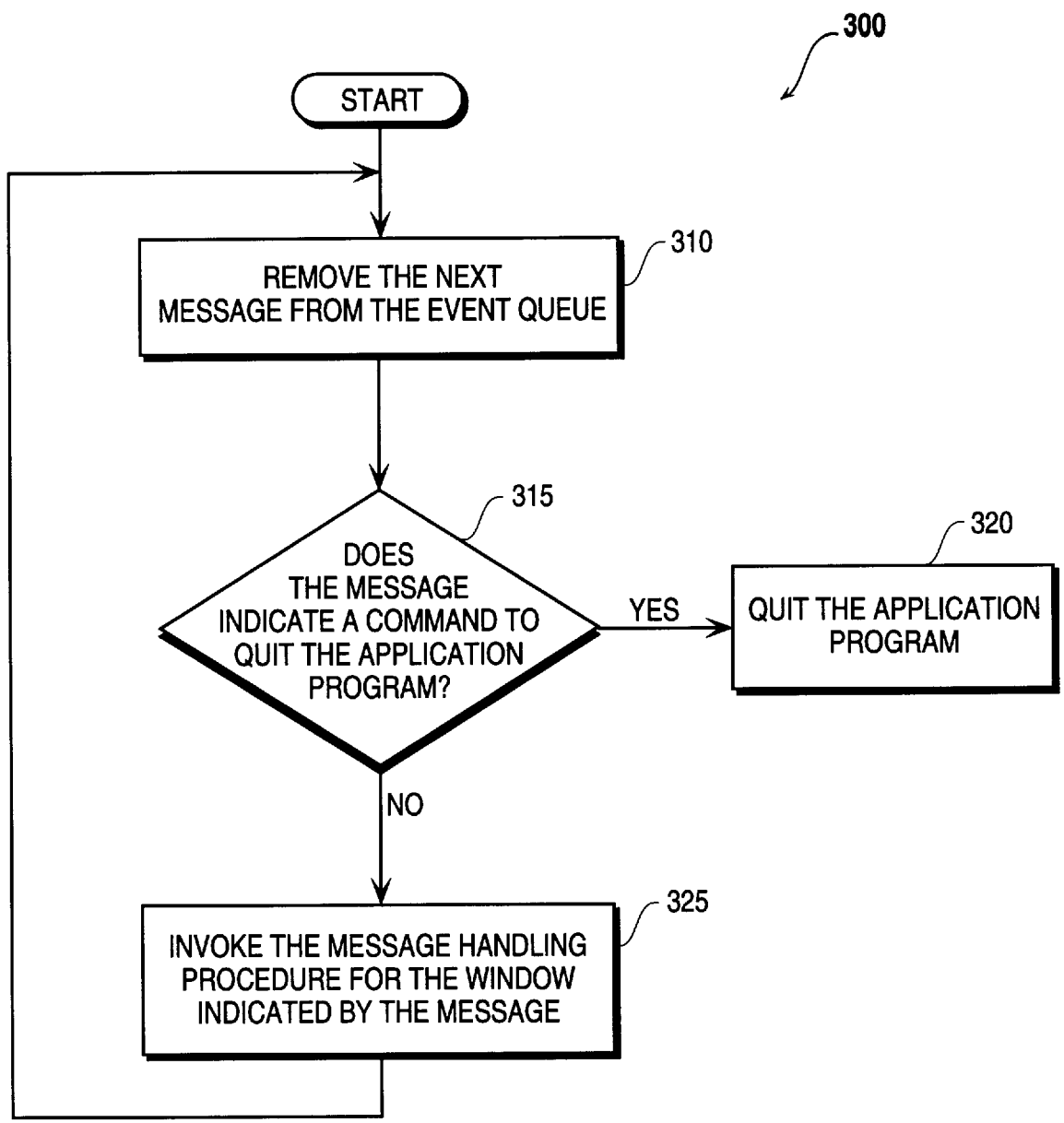
FIG. 3 depicts the flow diagram of an event loop which supports type-ahead capability.

FIG. 3 illustrates an event loop 300 which, in conjunction with the hardware event queue 250 described in FIG. 2, can be used to provide a type-ahead capability. The expression "type-ahead capability" refers to the ability of a computer to receive input during a first time interval and then process it during a second, later time interval. This typically occurs where execution of a previously requested operation prevents the computer from responding to user-input during the first time interval. The user-input is nonetheless stored in an event queue as described above in reference to FIG. 2, and then processed by the computer after completion of the previously requested operation. Type-ahead capability is most beneficial in programs which involve time-intensive operations such as bulk processing (i.e., execution of sequences of instructions which simply take a long time), inter-process communication, and communication with remote devices such as network servers and printers with remote processes or devices. In those situations, the ability to type-ahead allows the computer operator to continue entering data despite the temporary non-response of the system.

At step 310 of event loop 300 a message is removed ("dequeued") from the hardware event queue. This action is usually performed by calling an OS-supplied procedure. In Windows 3.x for example, an application program is not allowed to directly access the hardware event queue. Instead, Windows 3.x dequeues the message at the head of the hardware event queue on behalf of the application program when the application calls the Windows 3.x procedure "GetMessage".

Procedure GetMessage is fundamental to the non-preemptive application scheduling of the Windows 3.x operating system. If GetMessage finds a message for the calling application program, the message is returned to the application program as indicated in block 310 of event loop 300. If the message at the head of the event queue is not directed to the application program (e.g., a message indicating a mouse-click on another application program's window), GetMessage puts the application program to sleep until a message is dequeued that is directed to the application program. In this way, the sequence of user-input determines which application program is executed at any given time.

After a message is retrieved at step 310, the message is evaluated at step 315 to determine whether it indicates a request to quit the application program. If so, the application program is terminated at block 320. If the message does not indicate a request to quit the application program, a message handling procedure indicated by the message is called at step 325. An actual Windows 3.x event loop is given by the following C programming language listing:

```
WinMain( )
{
    MSG msg;    // see MSG datatype defined above.
    •           // Dots indicate other data definitions and
    •           // initialization source code.
    while (GetMessage(&msg, 0, 0, 0))
    {
        TranslateMessage(&msg);
        DispatchMessage(&msg);
    }
    return 0;
}
```

Although one might have expected a longer, more complicated source code listing, in most cases the event loop of a windows application is no more than the listing shown above. For completeness, the GetMessage, TranslateMessage and DispatchMessage functions are described below.

GetMessage actually retrieves messages from one of two different queues: the hardware event queue described above and another operating-system-maintained queue known as the application program's "private queue". Messages on the private queue take priority over messages on the hardware event queue so that, if both the private queue and the hardware event queue contain a message, GetMessage will return the message from the private queue before the message on the hardware event queue. This fact has implications for the implementation of the present invention and is discussed further below.

With the exception of a message that indicates a request to quit the application, all messages cause GetMessage to return a value of TRUE (in the C programming language, "TRUE" refers to any nonzero value). GetMessage accepts a pointer to the message structure "msg" as its first parameter and fills the structure with the values indicated by the message removed from the hardware event queue. The second, third and fourth parameters of GetMessage are used to filter the messages retrieved by GetMessage and are left at zero in the WinMain listing above.

The TranslateMessage function is used to further process keystrokes. TranslateMessage takes the virtual key code from certain messages retrieved by GetMessage and calls a device driver to convert the virtual key code into an ASCII code (ASCII stands for "American Standard Code for Information Interchange"). If a key has no ASCII equivalent, no translation is performed. If a key does have an ASCII equivalent, TranslateMessage calls the Windows OS function "PostMessage" to queue a new message including the ASCII character in the application program's private queue. Since the GetMessage function is designed to dequeue messages from the private queue before dequeuing messages from the hardware event queue, a message posted in the private queue as a result of the TranslateMessage call will be the message next dequeued and processed by the event loop. Consequently, if a user presses a series of keys that have corresponding ASCII codes, each message retrieved from the hardware event queue indicating a keypress will be followed by a message retrieved from the application program's private queue indicating the corresponding ASCII code.

The DispatchMessage function is used to invoke the message handling procedure, referred to as a "window procedure" in Windows 3.x lexicon. Thus, the DispatchMessage function of the WinMain listing above corresponds to block 325 of FIG. 3. Thus, a Windows 3.x application program does not directly call message handling functions, but rather does so indirectly through the DispatchMessage function provided by the Windows 3.x operating system. At least one reason for this is that the event loop and the message handling procedure (or procedures) use different data segments. DispatchMessage puts the data segment needed by the message handler in a predetermined processor register so that it can be installed in the data segment register upon invocation of the message handler.

Message Handler Supporting Type-Ahead Capability

Figure 4:
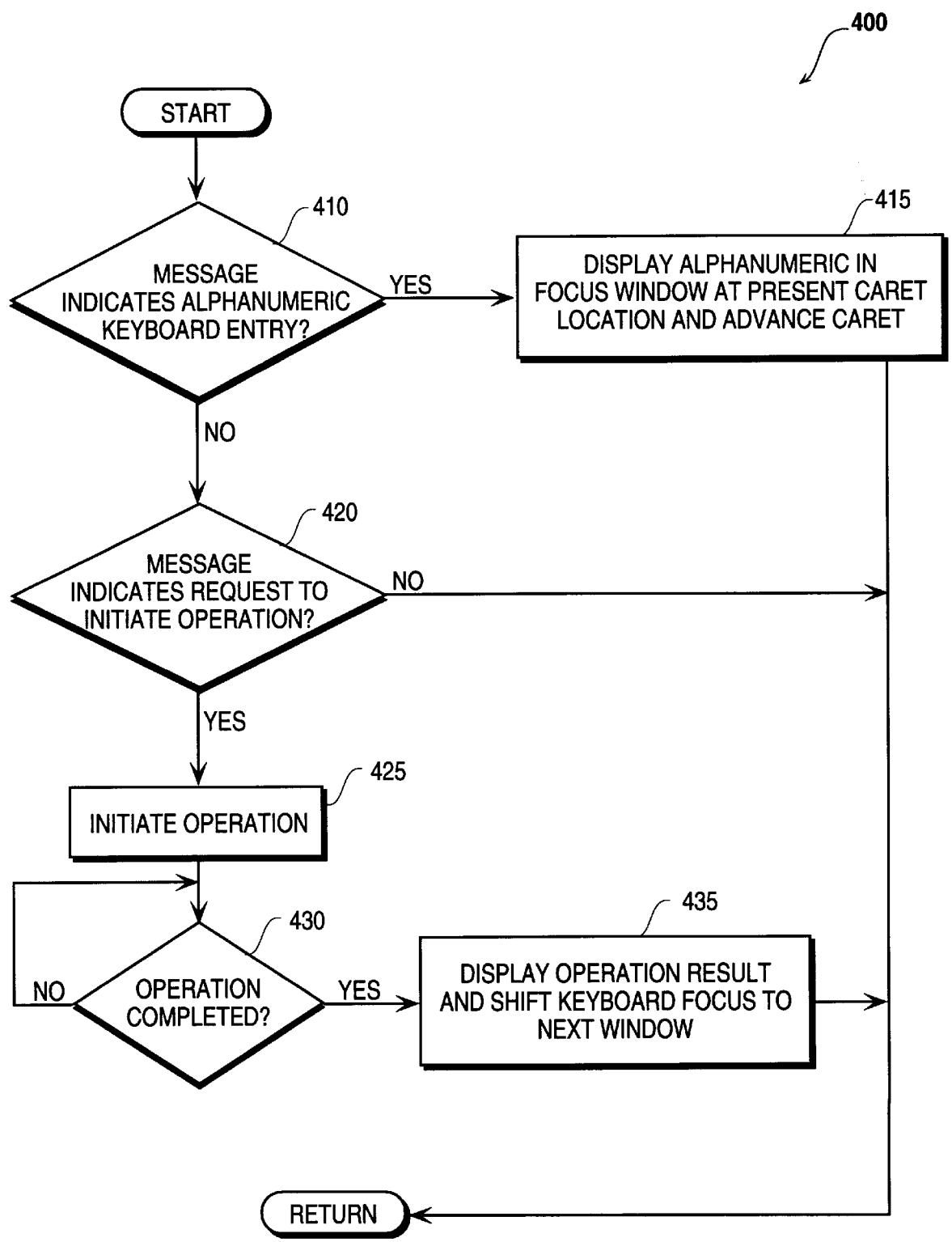
FIG. 4 depicts the flow diagram of a message handling procedure which, in conjunction with the event loop of FIG. 3, supports type-ahead, but not operation-abort capability.

FIG. 4 illustrates a simple message handling procedure 400 (message handler for short) used to handle input to the Company Name window 110 of the FIG. 1 order entry screen 100. While the message handler 400 is described below as handling alphanumeric input, initiating a data retrieval operation and polling for completion of the data retrieval operation, it will be appreciated that each of these processing tasks could be handled by separate procedures invoked by the event loop 300 of FIG. 3.

Message handler 400 is invoked at step 325 of the FIG. 3 event loop 300, discussed above. Message handler 400 receives the message removed from the hardware event queue by event loop 300 in the form of passed parameters. At execution step 410 of message handler 400, the message is examined to determine if it indicates alphanumeric input (i.e., numbers, letters and maybe punctuation marks, but not command input). If so, at step 415, program code is executed to display the indicated alphanumeric in the Company Name window (element 110 of FIG. 1) at the present caret location and advance the caret. After step 415 is completed, message handler 400 is exited and execution of the event loop of FIG. 3 resumes at step 310.

If, at decision block 410 of message handler 400, the message is determined not to indicate alphanumeric keyboard entry, the message is examined further at step 420 to determine if the message indicates a request to retrieve data from the database server. In FIG. 4, the data retrieval operation is referred to generically as an "operation" to emphasize that any time-intensive operation may be involved. If the message does not indicate a request to retrieve data, message handler 400 is exited. If the message does indicate a request to retrieve data, the data retrieval operation is initiated in step 425.

Thereafter, the message handler loops at step 430 until completion of the operation is detected.

It will be appreciated that in an actual implementation the construct indicated by decision block 430 represents a potential infinite loop if the database server fails to respond. For this reason, an actual implementation would include a timeout provision to limit the amount of time, or the number of block 430 iterations, spent waiting for completion of the operation.

If the user of the FIG. 1 order entry screen 100 types ahead the item ordered while the computer is busy looping at decision block 430, the keyboard input will be queued in the hardware event queue. After completion of the data retrieval operation is detected at block 430, step 435 will be executed to display the ID#, contact, telephone and address data in the appropriate windows and then to shift the keyboard focus to the Item window 135. Then, upon returning to the event loop 300 of FIG. 3, the typed-ahead data will be processed character by character and displayed in the Item window 135. Of course, if the order clerk attempted to abort the data retrieval operation by entering an abort command, the command would not be dequeued until after message handler 400 was exited and the event loop 300 of FIG. 3 once again began processing user-input. Thus, message handler 400 supports type-ahead, but not operation-abort capability.

Message Handler Providing Operation-Abort Capability

Figure 5:
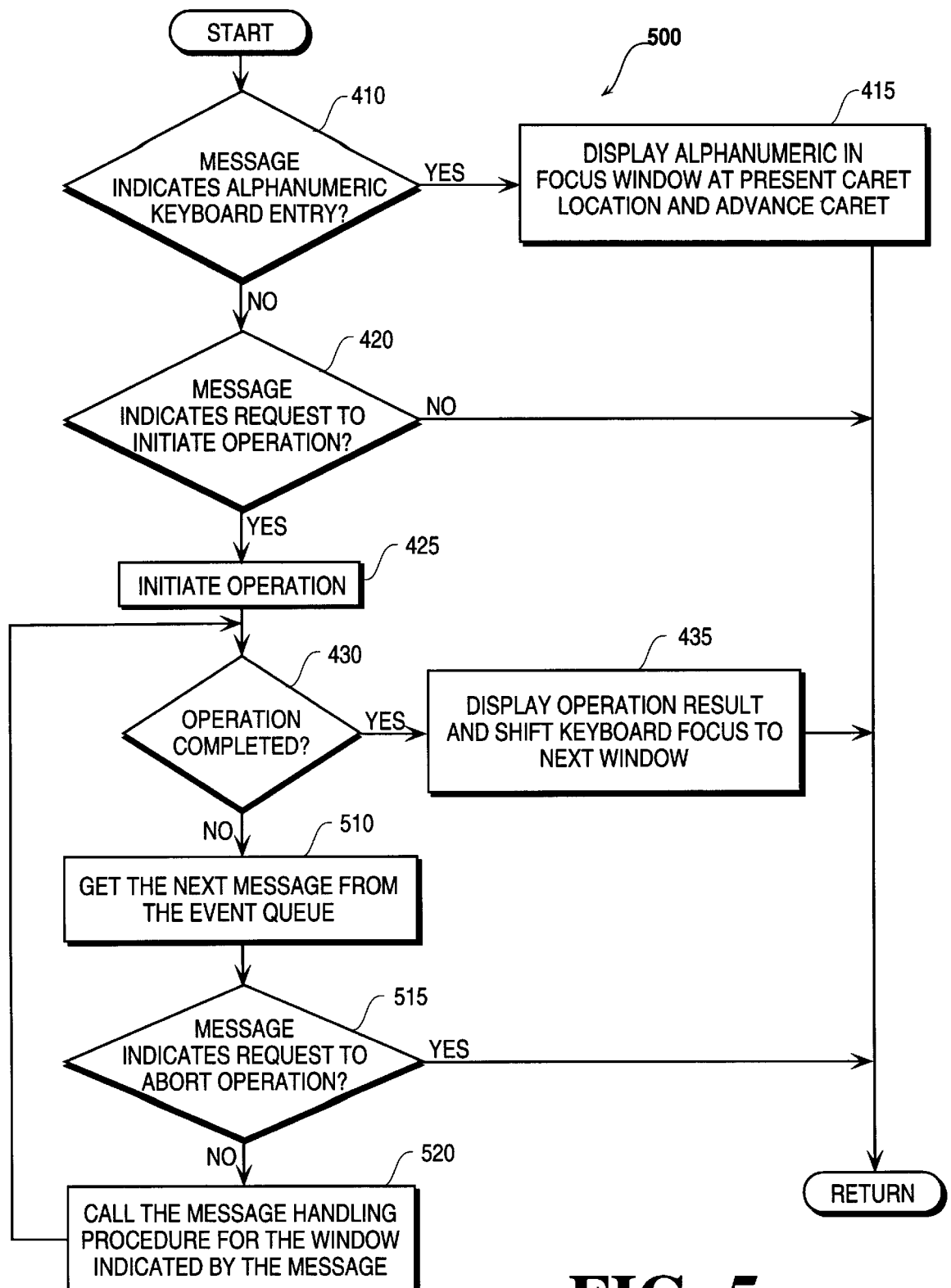
FIG. 5 depicts the flow diagram of a message handling procedure which supports operation-abort, but not type-ahead capability.

FIG. 5 illustrates a message handler 500 which provides operation-abort capability. Steps 410, 415, 420, 425, 430 and 435 are as shown in the message handler 400 of FIG. 4 and serve the same purpose as in message handler 400.

However, after decision block 430 is executed, instead of simply looping immediately back to decision block 430 to determine whether the operation has completed, execution proceeds to step 510 where the next message from the hardware event queue is retrieved. At step 515, the message is examined to determine whether it indicates an abort command. If the message indicates an abort command, the message handler 500 is exited and the event loop takes over from there. The action taken if the message does not indicate an abort command is discussed further below, but for the time being assume that the message is sent on to the message handling procedure for the window indicated by the message (i.e., the present keyboard focus) as shown in block 520. After step 520, execution of decision block 430 is repeated and the next message in the hardware event queue, if any, is removed (step 510) and examined to determine if the user has decided to abort the operation (step 515). In this way steps 430, 510, 515 and 520 can be iteratively performed to determine of any of the messages queued in the hardware event queue indicate an abort command.

Returning to the matter of what should be done with a message that has been dequeued at step 510 but does not indicate an abort command, it should first be noted that the message cannot simply be placed back on the hardware event queue for at least two reasons. First, as in the case of Windows 3.x, the operating system may not allow it. Second, putting the message back on the queue without compromising the FIFO nature of the queue requires that the message be re-queued. That is, that the message would have to be put back at the tail of the queue. The result would be a re-sequencing of the queued input events. Even if each of the queued events could be removed, examined and re-queued so as to reproduce the original input event sequence, new input events may be queued by an interrupt handler at any time. Consequently, the original sequence of input events would likely be lost due to a stream of intervening events.

Since the message cannot be put back on the hardware event queue, it will be lost unless it is handled by a message handling procedure. As discussed above in reference to step 520, the message handler for the window indicated by the message could be called to process the message. To appreciate the potential pitfalls of sending the message to a message handling procedure at this point in the program execution, however, consider the FIG. 1 order entry screen 100. Recall that the application program procedure that receives the remaining company information is responsible first for delivering the information to the ID#, Contact, Telephone and Address windows (115, 120, 125 and 130, respectively) and then for transferring the keyboard focus to the Item window 135 so that the order clerk can enter the item. Thus, prior to receiving a response from the database server, the keyboard focus remains on the Company Name window 110. Since, as discussed above, the window to which a message is directed by the Windows 3.x operating system is the window having keyboard focus at the time the message is removed from the hardware event queue, simply calling the message handler indicated by the message will result in calling the message handler for the Company Name window 110. Consequently, the item data typed-ahead by the order clerk and intended for the Item window 135 will erroneously be displayed in the Company Name window 110. In effect, by prematurely removing messages from the hardware event queue, the messages are directed to the focus window existing before a previously requested operation that is expected to change the focus window has completed.

To avoid directing messages to the wrong window, step 520 of message handler 500 could be simply be skipped, effectively discarding the messages removed from the hardware event queue in step 510. In that case, steps 510 and 515 would still provide the ability to detect abort commands, but type-ahead capability would be lost.

Message Handler Supporting Both Type-Ahead and Abort Capability

Figure 6:
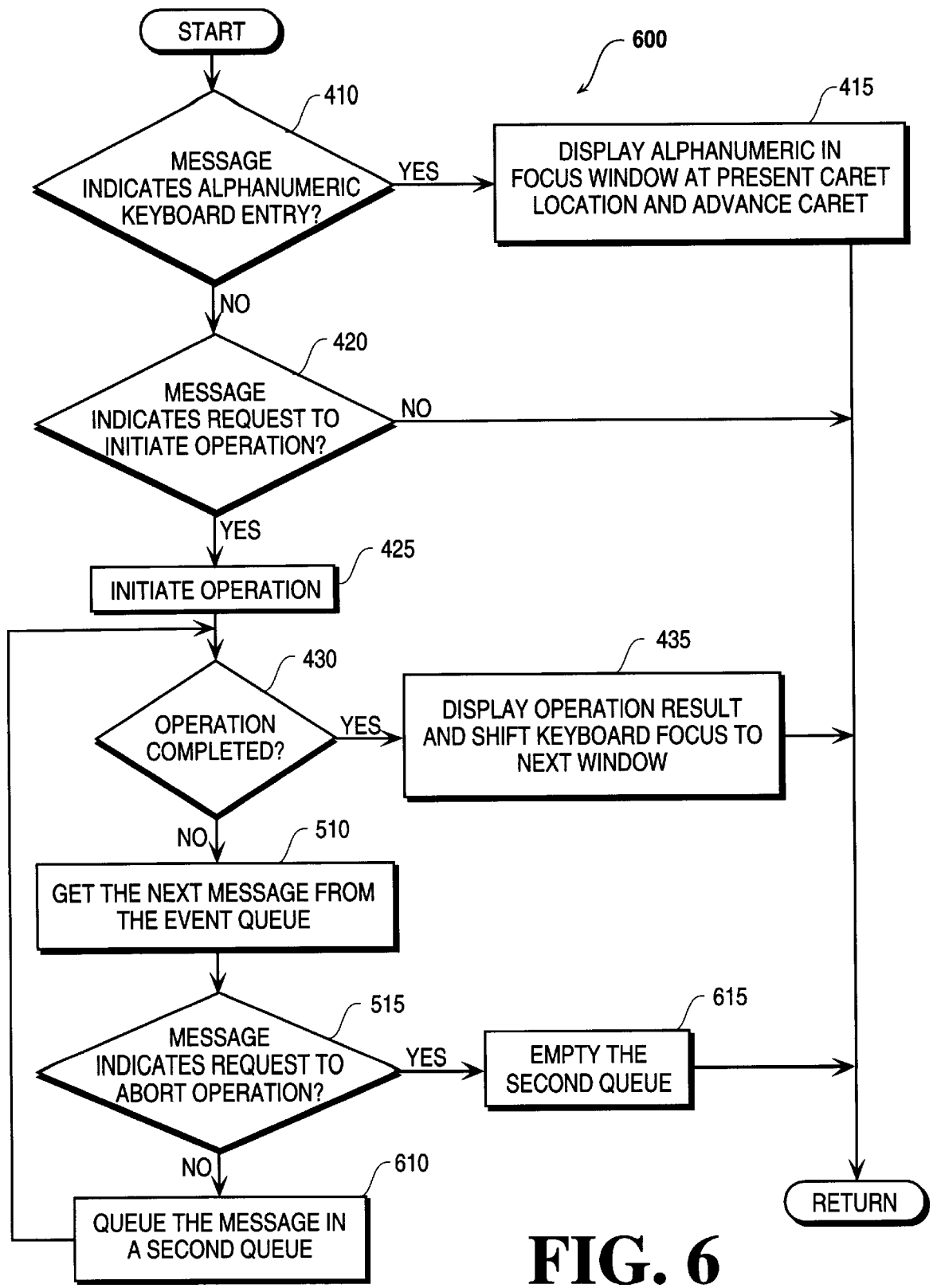
FIG. 6 depicts the flow diagram of a message handling procedure which supports both operation-abort and type-ahead capability.

FIG. 6 depicts the flow diagram of a message handler 600 which supports both operation-abort and type-ahead capability. Steps 410, 415, 420, 425, 430, 435, 510 and 515 perform the same function as described in FIG. 5. However, if at step 515, the message is determined not to indicate a command to abort the previously requested operation, the message is queued in a second queue at step 610. As will be discussed further below, the effect of queuing the message in a second queue at step 610 is to extend the hardware event queue into a queue under control of the application program. If the message does indicate a command to abort the previously requested operation, the second queue is emptied at step 615.

As an aside, it should be noted that in a Windows 3.x application program the function GetMessage is unsuitable to retrieve a message from the hardware event queue as required by step 510 of message handler 600. The reason for this is that, should the event queue be empty, it would be undesirable to allow GetMessage to put the application to sleep. Fortunately, Windows 3.x provides a procedure called "PeekMessage" which, rather than putting the application to sleep if the event queue is empty, simply returns FALSE (zero). PeekMessage is otherwise similar to GetMessage.

When a Windows 3.x application program calls the function PeekMessage to retrieve a message from the hardware event queue during step 510 of message handler 600, it should only peek for keyboard messages. Doing so will ensure that other messages such as mouse messages and software queued messages (i.e., certain messages queued as a result of calls to PostMessage), will not be queued in the second queue. This is important because placing non-keyboard messages in the second queue might interfere with the expected behavior of the application program. Like GetMessage, the PeekMessage function includes formal parameters for filtering the messages returned. By passing the constant values WM_KEYFIRST and WM_KEYLAST as the third and fourth actual parameters passed to PeekMessage, only keyboard messages will be returned.

Event Loop Supporting Type-Ahead and Abort Capability

Figure 7:
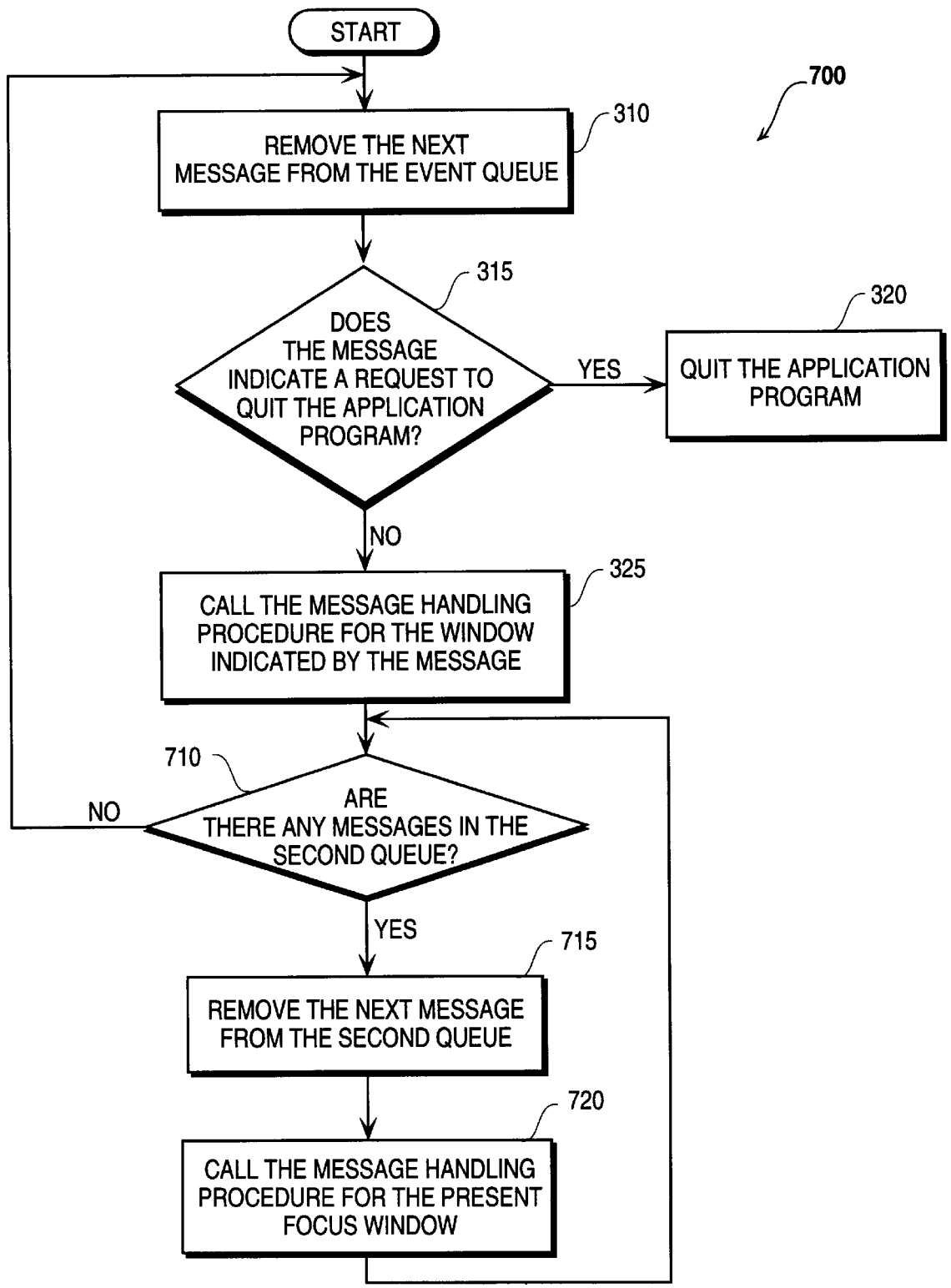
FIG. 7 depicts the flow diagram of an event loop which, in conjunction 15 with the message handling procedure of FIG. 6, supports type-ahead capability.

FIG. 7 depicts the flow diagram of an event loop 700 modified to support the second queue filled by message handler 600 of FIG. 6. Blocks 310, 315, 320 and 325 of event loop 700 perform the same function as discussed above in regard to event loop 300 of FIG. 3. However, after calling the message handling procedure at block 325, the second queue is checked at step 710 to determine whether any messages were queued in the second queue during the execution of message handler 600. If there are no messages in the second queue, execution returns to block 310 and the event loop is repeated. However, if there is a message in the second queue, the message will be removed from the second queue at step 715. Recall that this message was actually removed from the hardware event queue during step 510 of message handler 600. At that time the window handle member of the message was assigned the value of the then focus window by the Windows OS. The significance of this is that simply calling the message handler identified in the message removed from the second queue may result in the message being erroneously sent to a window that was, but is no longer, the keyboard focus. Therefore, the window handle assigned by the Windows OS is overwritten with the window handle of the present keyboard focus. This is accomplished at step 720 by calling the message handler for the present keyboard focus. Recall that in a windows application a message handler is effectively called by setting the window handle member of the message structure and calling the Windows DispatchMessage routine. Thus, one C programming language implementation of event loop 700 of FIG. 7 would be:

```
WinMain2( )
{
    MSG msg;    // see MSG datatype defined above
    •           // Dots indicate other data definitions and
    •           // initialization source code
    while (GetMessage(&msg, 0, 0, 0))
    {
        TranslateMessage(&msg);
        DispatchMessage(&msg);
        while (GetMessageQ2(&msg))
            DispatchMessage(&msg);
    }
    return 0;
}
```

Function GetMessageQ2 is a procedure to be included with the application program code and may be implemented in such a way that it performs steps 710, 715 and part of step 720 of event loop 700. For example, GetMessageQ2 could be designed to return FALSE (zero) if no messages are in the second queue, thereby performing decision 710. Further, GetMessageQ2 could perform step 715 by removing any message at the head of the second queue and writing the message data into memory at the location indicated by pointer "&msg". Finally, GetMessageQ2 could also be designed to override the window handle assigned the hwnd member of the message data structure by the Windows 3.x operating system with the handle of the present focus window. As a result, the subsequent call to DispatchMessage will invoke the message handling procedure for the present focus window as indicated in step 720.

Note that function TranslateMessage is not called during the GetMessageQ2 processing loop as it is in the GetMessage loop. This is not because messages in the second queue do not need to be processed by TranslateMessage; they do. Unfortunately, calling TranslateMessage in the GetMessageQ2 processing loop results in messages being processed out of sequence. The reason for this is that GetMessageQ2 does not dequeue messages from the application program's private queue as GetMessage does. Recall that when GetMessage retrieves a message indicating a keypress having an ASCII representative, TranslateMessage causes a separate message containing the representative ASCII code to be queued on the application program's private queue. Also recall that the next GetMessage call will dequeue the message from the private queue rather than the hardware event queue. This means that to replicate the message processing sequence of the GetMessage event loop, GetMessageQ2 must dequeue an ASCII code message after every keypress message in the second queue that has an ASCII representative. Simply calling TranslateMessage after GetMessageQ2 will not accomplish this because TranslateMessage will cause the ASCII message to be queued in the application program's private queue and not in the second queue. Since the private queue will not be examined until after all messages in the second queue have been processed by the GetMessageQ2 loop, messages will be processed in the sequence: keypress msg, keypress msg, keypress msg, ASCII code msg, ASCII code msg, ASCII code msg; and not the desired sequence: keypress msg, ASCII code msg, keypress msg, ASCII code msg, keypress msg, ASCII code msg.

The solution to this problem is to queue the ASCII code messages in the second event queue immediately following the keypress messages to which they correspond. This is accomplished in the present invention by calling the TranslateMessage function between steps 515 and 610 of message handler 600 (FIG. 6). By calling TranslateMessage after calling PeekMessage in step 510 and after determining that the message is not an abort command in step 515, any keypress message retrieved in step 510 that has an ASCII representative will result in a corresponding ASCII code message being queued in the application program's private queue. Then, after the keypress message is queued in the second queue at step 610, the ASCII code message will be the next message dequeued at step 510 and queued in the second queue at step 610 (like GetMessage, the PeekMessage function dequeues messages from the private queue before messages from the hardware event queue). At this point each keypress message in the second queue is followed by the corresponding ASCII code message. Consequently, when the second queue is processed in event loop 700 of FIG. 7, event messages will be processed in the proper sequence.

Operation-Abort and Type-Ahead Support in Action

Consider now the message handler 600 and event loop 700 depicted in FIGS. 6 and 7, respectively, in the context of the FIG. 1 order entry screen 100. Assume that after entering the company name and pressing the key (or keys) which initiates the data retrieval operation, the order clerk types ahead the word "Pencils". Assume further that after the data retrieval operation is initiated at step 425 of message handler 600, no response from the database server is detected in step 430 for a number of iterations. In that case, steps 510, 515 and 610 of message handler 600 will be iteratively executed to remove messages indicating the typed-ahead characters ('P', 'e', 'n', 'c', 'i', 'l', 's') from the hardware event queue, confirm that none of the messages indicate a command to abort the data retrieval operation, and then queue the characters on the second queue. If, after the string "Pencils" has been queued on the second queue, data retrieval is completed, program execution proceeds from step 430 to step 435 where message handlers for the Company Name, ID#, Contact, Telephone and Address windows (110, 115,120,125 and 130) will be invoked to display the retrieved information designated for each window, and the keyboard focus will be shifted to the Item window 135. Thereafter, the message handler 600 will be exited and program execution will continue at step 710 of event loop 700.

Upon detecting a message in the second queue at step 710, step 715 is executed to remove the message indicating the alphanumeric 'P' from the second queue. At step 720, the message handler for the present keyboard focus, i.e., the FIG. 1 Item window 135, is called. As stated above, in a Windows 3.x application program, calling the message handler for the present keyboard focus as indicated in step 720 involves overriding the window handle assigned to the hwnd member of the message data structure by the operating system with the window handle of the present keyboard focus and then calling DispatchMessage. Since the keyboard focus has now been shifted to the Item window 135 of Order Entry Screen 100, the character 'P' will be displayed in the Item window 135 by the Item window message handler. Thereafter, steps 710, 715 and 720 will be repeated until each of the typed-ahead characters is displayed in the Item window 135. At that point the second queue will have been emptied and program execution will proceed from block 710 to block 310 to check for more input events in the hardware event queue.

Returning to the point in the example above where the order clerk typed ahead the string "Pencils", suppose further that the order clerk, realizing that the wrong company name had been entered, presses ctrl-break, ctrl-c or any other designated keys to abort the data retrieval operation (or, at least, to abort the routine awaiting a response from database server). Now, after repeated execution of steps 510, 515 and 610 to queue the string "Pencils" in the second queue, the message handler will remove the message indicating the abort command from the hardware event queue at step 510. Upon detecting the abort command at step 515, program execution will proceed to block 615 where the second queue is emptied. It will be appreciated that emptying the second queue after detecting an abort command may not be desirable in every application program and that step 615 therefore represents an optional operation. However, in the Order Entry Application of FIG. 1, aborting the data retrieval operation means leaving the keyboard focus in the Company Name window 110. Consequently, omitting to empty the second queue at step 615 would result in the characters "Pencils" being entered into the Company Name window 110 by event loop 700. By emptying the second queue in step 615 of message handler 600, this undesirable result is avoided.

From one perspective, the second queue referenced in steps 610 and 615 of FIG. 6 and steps 710 and 715 of FIG. 7 constitutes an extension of the hardware event queue. Of course, the Windows OS knows nothing about the second queue, but the practical effect of dequeuing messages from the hardware event queue and then re-queuing them on the second queue is to define a single queue having a head at the head of the second queue and a tail at the tail of the hardware event queue. The transfer of messages from the head of the hardware event queue to the tail of the second queue can be thought of as providing a view into the middle of the total queue allowing messages to be examined.

If the second queue can be viewed as an extension of the hardware event queue, the function performed by step 720 of event loop 700 may similarly be viewed as an extension of the Windows OS management of the hardware event queue. Since the act of queuing a message on the second queue effectively restores the message to the total event queue defined by the second queue and the hardware event queue, removal of the message from the second queue is implemented in a manner mirroring the removal the message from the hardware event queue by the Windows 3.x OS. That is, when a message is removed from the second queue it is associated with the present keyboard focus. This is so despite the fact that the Windows 3.x OS performed that very function when the message was removed from the hardware event queue.

Maintaining Control of the Event Loop

Those skilled in the art of developing application programs for Windows operating systems will appreciate that there are at least two times when the Windows OS, and not the application program, has control over user-input processing: when the application program displays a modal dialog box, and when the keyboard focus is on a menu.

When an application program calls the Windows OS function "DialogBox" to display a modal dialog box, the parent window is disabled and an event loop in the Dialog-Box function is executed instead of the application program event loop. Of course, the DialogBox event loop does not include program code to check the second queue described above. Consequently, the DialogBox event loop will remove user-input from the hardware event queue without checking for prior user-input queued in the second queue. This means that if the function DialogBox is called before all user-input events in the second queue have been processed, user-input events will be processed out of sequence.

In the preferred embodiment of the present invention, this problem is avoided by not calling the DialogBox function. When a dialog box needs to be displayed, the application program calls the Windows OS procedure "CreateDialog" instead of DialogBox. CreateDialog is very similar to DialogBox except that it does not disable its parent and it does not invoke its own event loop. Consequently, by coding the application program to disable its parent before calling CreateDialog and to support dialog box input in the application program's event loop, the behavior of the DialogBox function is achieved, but without invoking a separate event loop.

In one embodiment of the present invention dialog box input is handled by first determining whether the input indicates a request to change the keyboard focus. Input events which change the keyboard focus are referred to as "navigation events" and include pressing the tab, arrow, escape, enter, or alt+character keys. Of course, whether a particular keystroke is interpreted as a navigation event is determined in the context of the window having keyboard focus. If the message does not indicate a navigation event (a message indicating a printable character, for example), the message is dispatched to the indicated window by Dispatch-Message. If the message does indicate a navigation event, the application program performs the navigation dictated by the navigation event. For example, if the message indicates that a tab or arrow key has been pressed, the keyboard focus is changed to the appropriate window by calling the SetFocus routine provided by the Windows OS. The other navigation keys can similarly be handled to support dialog box input without having to invoke a separate event loop.

When the keyboard focus is on a menu, a menu-supporting event loop is executed instead of the application program's event loop. Again, if user-input events are present in the second queue, execution of the menu-supporting event loop will result in input events being processed out of sequence. This situation is more problematic than that of the dialog box, because the Windows OS creates and maintains at least some of the menus automatically (e.g., the system menu). Consequently, it is not a simple matter to avoid entering the menu-supporting event loop.

In the present invention, the problem of processing user-input out of sequence due to execution of the menu-supporting event loop is avoided by emptying the second queue upon receiving a message indicating that a menu has been selected by the user. This results in the loss of input events queued in the second queue, but avoids the potentially worse consequence of processing user-input events in the wrong sequence.

Computer System Overview

Figure 8:
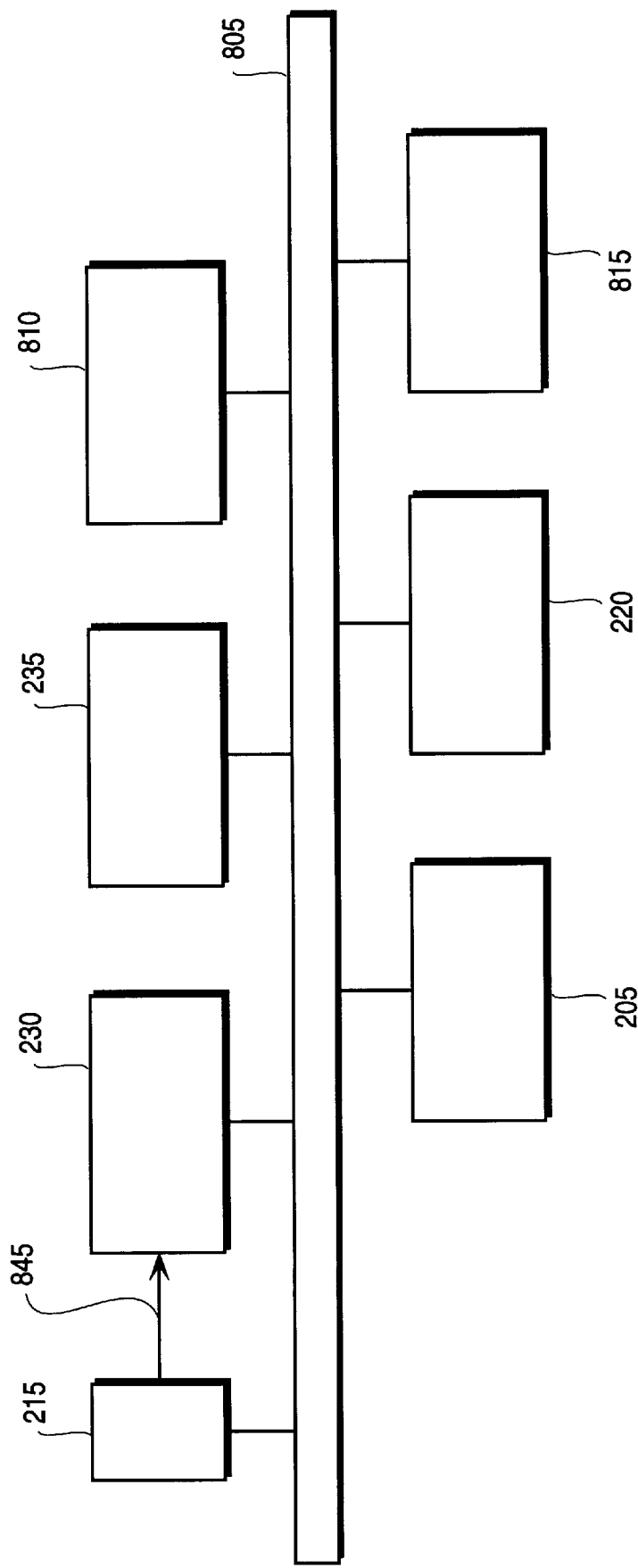
FIG. 8 depicts a block diagram of a computer which can be used to execute the method steps of the present invention.

FIG. 8 depicts a block diagram of a general purpose computer system 800 for performing the individual steps of the method of the present invention. The computer system 800 includes a processor 230, memory 235, display device 810, keyboard 205, cursor control device 220, and hardcopy output device 815 each coupled to a bus 805. Bus 805 typically includes an address bus, data bus and control bus (not shown). The control bus includes conductors for transmitting interrupt request signals from devices such as keyboard and cursor control device to a programmable interrupt controller (PIC) 215 which is also coupled to the bus 805. The programmable interrupt controller 215, upon detecting an interrupt request signal, will assert an interrupt signal to processor 230 as indicated by arrow 845.

Cursor control device 220 may be a mouse, trackball, pen or any other device for manipulating a cursor on display 810. Both the cursor control device 220 and the keyboard 205 enable the computer system 800 to receive input from a computer-user.

Memory 235 includes both operating memory (e.g., random access memory) and non-volatile storage such as a semiconductor read-only-memory, hard disk-drive, floppy disk-drive, optical disk-drive or any other computer-readable medium. When power is applied to the computer system 800, program code defining an operating system (OS), is loaded from non-volatile storage into operating memory by processor 230 or another device, such as a direct memory access controller (not shown), having access to memory 835. Sequences of instructions comprised by the OS are then executed by processor 230 to load other computer programs and portions of computer programs into operating memory from non-volatile storage. The present invention may be embodied in a sequence of instructions which can be stored in a computer-readable medium and executed by processor 230.

It should be noted that the individual method steps of the present invention may be performed by a general purpose processor programmed with instructions that cause the processor to perform the recited steps (as described above), specific hardware components that contain hard-wired logic for performing the recited steps, or any combination of programmed general purpose computer components and custom hardware components may also be used. Nothing disclosed herein should be construed as limiting the present invention to a single embodiment wherein the recited steps are performed by a specific combination of hardware components.

A method for processing user-input which may contain a command to abort a previously requested operation or data entered in anticipation of completion of the previously requested operation is thus described. While the present invention has been described in particular embodiments and through particular examples, the present invention should not be construed as limited by such embodiments and examples, but rather construed according to the following claims.

What is claimed is:

1. A method for processing user-input that may include a command to abort a previously requested operation or data entered in anticipation of completion of the previously requested operation, the user-input being represented by a value queued in a first queue by an operating system, said method comprising the computer-implemented steps of:

determining if the value represents a command to abort the previously requested operation;

aborting the previously requested operation if the value represents a command to abort the previously requested operation;

if the value does not represent a command to abort the previously requested operation, performing the steps of queuing the value in a second queue, removing the value from the second queue after completion of the previously requested operation, and associating the value with a display window to which user-input is focused after completion of the previously requested operation.

2. The method of claim 1 further comprising the step of removing the value representing user-input from the first queue.

3. The method of claim 2 wherein said step of removing the value representing user-input from the first queue comprises the step of executing a procedure included in program code defining the operating system to remove the value from the first queue and to associate the value with the display window to which user-input is focused before completion of the previously requested operation.

4. The method of claim 2 wherein said step of removing the value representing user-input from the first queue comprises the step of removing a value representing one or more keystrokes from the first queue.

5. The method of claim 1 wherein said step of determining if the value indicates a command to abort the previously requested operation comprises the step of determining whether the value matches a pre-determined abort value.

6. The method of claim 1 wherein said step of aborting the previously requested operation comprises the step of terminating execution of a procedure that had been being executed to detect completion of the previously requested operation.

7. The method of claim 6 wherein said step of terminating execution of a procedure that had been being executed to detect completion of the previously requested operation comprises the step of terminating execution of a procedure included in program code defining an application program.

8. The method of claim 1 wherein said step of aborting the previously requested operation comprises the step of terminating execution of a procedure that had been being executed to complete the previously requested operation.

9. The method of claim 1 wherein said step of aborting the previously requested operation further comprises the step of emptying the second queue.

10. The method of claim 1 wherein said step of associating the value with a display window to which user-input is focused comprises the step of assigning a value identifying the display window to a member of a data structure, the data structure including a member containing the value representing user-input.

11. The method of claim 1 wherein said step of associating the value with a display window to which user-input is focused comprises the step of associating the value with either an active window of an application program or a child window of the active window.

12. The method of claim 1 further comprising the step of executing an application procedure associated with the display window to respond to the user-input represented by the value.

13. A computer-readable medium having a plurality of sequences of instructions stored thereon which, when executed by a processor, cause said processor to handle user-input that may include a command to abort a previously requested operation or data entered in anticipation of completion of the previously requested operation, the user-input being represented by a value queued in a first queue by an operating system, said plurality of sequences of instructions including sequences of instructions which, when executed by said processor, cause said processor to perform the steps of:

removing the value representing user-input from the first queue;

determining if the value represents a command to abort the previously requested operation;

aborting the previously requested operation if the value represents a command to abort the previously requested operation;

if the value does not represent a command to abort the previously requested operation, performing the steps of queuing the value in a second queue, removing the value from the second queue after completion of the previously requested operation, and associating the value with a display window to which user-input is focused after completion of the previously requested operation.

14. The computer-readable medium of claim 13 wherein said step of removing the value representing user-input from the first queue comprises the step of calling a procedure included in program code defining the operating system to remove the value from the first queue and to associate the value with a display window to which user-input is focused before completion of the previously requested operation.

15. The computer-readable medium of claim 13 wherein said step of determining if the value indicates a command to abort the previously requested operation comprises the step of determining whether the value matches a pre-determined abort value.

16. The computer-readable medium of claim 13 wherein said step of associating the value with a display window to which user-input is focused comprises the step of assigning a value identifying the display window to a member of a data structure, the data structure including a member containing the value representing user-input.

17. The computer-readable medium of claim 13 wherein said step of associating the value with a display window to which user-input is focused comprises the step of associating the value with either an active window of an application program or a child window of the active window.

18. The computer-readable medium of claim 13 wherein said step of removing the value representing user-input from the first queue comprises the step of removing a value representing one or more keystrokes from a queue for receiving values representing keyboard entry.

19. A computer comprising:

a processor;

a user-input device coupled to said processor;

a display coupled to said processor; and a memory coupled to said processor and having stored therein operating system program code defining an operating system; and application program code which, when executed by said processor, causes said processor to handle user-input that may include a command to abort a previously requested operation or data entered in anticipation of completion of the previously requested operation, the user-input being represented by a value queued in a first queue by execution of a portion of the operating system program, said application program code including sequences of instructions which, when executed by said processor, cause said processor to perform the steps of:

removing the value representing user-input from the first queue;

determining if the value represents a command to abort the previously requested operation;

aborting the previously requested operation if the value represents a command to abort the previously requested operation;

if the value does not represent a command to abort the previously requested operation, performing the steps of queuing the value in a second queue, removing the value from the second queue after completion of the previously requested operation, and associating the value with a window in said display after completion of the previously requested operation.

20. The computer of claim 19 wherein the first queue is a keyboard entry queue for receiving values representing keyboard entry and said step of removing the value representing user-input from the first queue comprises the step of removing a value representing one or more keystrokes from the keyboard entry queue.

21. In a computer, a method for processing a value representing user-input queued in a first queue by a Windows operating system of the computer prior to completion of a previously requested operation, said method comprising the steps of:

determining if the value represents a command to abort the previously requested operation;

aborting the previously requested operation if the value represents a command to abort the previously requested operation;

if the value does not represent a command to abort the previously requested operation, performing the steps of queuing the value in a second queue, removing the value from the second queue after completion of the previously requested operation, and associating the value with a display window after completion of the previously requested operation.

22. The method of claim 21 wherein said step of determining if the value represents a command to abort the previously requested operation comprises the step of executing a procedure included in program code defining the Windows operating system to remove the value from the first queue.

* * * * *